3,090,715
CHEMICALLY MODIFIED POLYDIOLEFIN RESIN AS AN ADHESIVE

Hadden Clark, Plainfield, James M. Throne, North Plainfield, and Ober C. Slotterbeck, Rahway, N.J., assignors to Esso Research and Engineering Company, a corporation of Delaware
Filed Aug. 25, 1958, Ser. No. 757,113
12 Claims. (Cl. 154—43)

This invention relates to a method for producing a strong bond between a metal and polyolefin. More particularly it relates to a unitary structure comprising a metal and a polyolefin which is bonded together with a polydiolefin resin.

In the past, it has been possible to adhere one metal with another by having a polymeric resin of butadiene with styrene therebetween. However, it has been found that this polymeric resin, per se, does not impart an effective bond between a metal and a polyolefin plastic. Thus, a serious disadvantage is encountered in certain applications where the strength of this type of structure is paramount, as exemplified in an undersea cable in which the metal wire is insulated with a polyolefin plastic.

It has now been discovered that a chemically modified polydiolefin resin will effectively adhere a metal to a polyolefin plastic, which results, therefore, in a structure with increased strength and resistance to moisture.

Thus, in accordance with one embodiment of this invention, the metal and/or the polyolefin plastic are coated with a resinifiable polymer mix, the chemically modified polydiolefin being incorporated therein. The coated materials are then formed in layers and cured to a unitary structure.

The metals within the scope of this invention are not limited to any particular group. For example, tin plate, black iron, stainless steel, copper, brass, or aluminum can all be bonded to a polyolefin plastic if a modified polydiolefin resin is applied thereon. The thickness of the metal can vary from thin fibers to thick sheets but the thickness will generally be in the range of 1/1000 to ¼ inch.

For the purpose of this invention, the plastic, to which the metal is adhered, is a polyolefin made from a monomer which contains 2 to 12 carbon atoms per molecule, e.g., polyethylene, polypropylene, polybutene, polyheptene, and the like. The polyolefin, polyethylene, being preferred, can be prepared by any known method. A suitable method is the polymerization of ethylene at low pressures, e.g., 0 to 500 p.s.ig., and low temperature, e.g., 0 to 100° C., in the presence of a catalyst. The catalysts used in this polymerization reaction are solid, insoluble reaction products obtained by reducing a reducible heavy transition metal compound, the metal component of which is taken from groups IVB, VIB, or VIII or manganese with a reducing organometallic compound of an alkali, alkaline earth, rare earth, or zinc metal compound. The catalyst can also be prepared by reducing an appropriate metal compound with either metallic aluminum, or a mixture of aluminum and titanium, or the like. The preferred catalyst of this type is usually prepared by reducing one mole of a titanium tetrahalide, preferably tetrachloride, to the corresponding trivalent titanium halide with about 0.2 to 6 moles of either aluminum triethyl or aluminum triisobutyl or other aluminum alkyl compound of the formula RR'AlX wherein R, R', and X preferably are alkyl groups having from 2 to 8 carbon atoms, although X can be hydrogen or halogen, preferably chlorine. In addition to the catalyst, an inert hydrocarbon solvent, which is preferably a $C_3$ to $C_{18}$ paraffin, e.g., isopentane, n-heptane, and the like, may be used in the polymerization. The end product, e.g., polyethylene, generally has a molecular weight in the range of 12,000 to 500,000 or more. These polyolefins are discussed in detail in the Belgian Patent 533,362; Chemical and Engineering News, April 8, 1957, pages 12 to 16; and Petroleum Refiner, December 1956, pages 191 through 196, the subject matter of which is incorporated herein by reference.

Again, there is no limitation of the thickness of plastic which can be bonded to the metal although the range will probably be between 1/10,000 and ¼ inch.

The metal and/or the polyolefin, e.g., polyethylene, described above are then coated with a resinifiable polymer mix. This mix generally comprises a curable liquid polymer containing oxygen in the structure, a crosslinking agent, and a catalyst. Crosslinking agents, if added, effect a crosslinking of the resin. Such agents comprise the following compounds: vinyl aromatics as styrene and vinyl toluene; halo styrenes; vinyl naphthalenes; alkylacrylates and methacrylates; and allyl esters. Preferred compounds are diallyl phthalate and the styrenes. The especially preferred compound is vinyl toluene (monomethyl styrene). The crosslinking agent should be incorporated in the range of 0 to 60% of the curable polymer mix, preferably 20 to 50%. A catalyst is incorporated in the mix within the range of 0.2 to 10 parts, preferably 2 to 6 parts, and should be of the free radical or peroxide type. Preferred catalysts are dicumyl peroxide and/or ditertiary butyl peroxide.

Curable polymers in the mix within the purview of this invention comprise the oils obtained by polymerizing conjugated diolefins having 4 to 6 carbon atoms per molecule which have been chemically modified to incorporate oxygen in the structure, e.g., by air blowing or by adding an anhydride of an unsaturated dicarboxylic acid thereto. A polydiolefin oil, per se, does not give the superior results obtained by the aforementioned modified oil. The synthetic polymeric oil may be prepared by mass polymerization (either in the presence of a hydrocarbon soluble peroxide catalyst or in the presence of metallic sodium) of diolefins, particularly those having 4 to 6 carbon atoms per molecule, such as butadiene, isoprene, dimethyl butadiene, piperylene, and methyl pentadiene. Diolefins copolymerized with minor amounts of ethylenically unsaturated monomers as styrene, acrylonitrile, methyl vinyl ketone, or with styrenes having alkyl groups substituted on the ring (paramethyl styrene, dimethyl styrene, etc.), may also be used.

An especially preferred polymeric oil is one prepared by reacting 75 to 100 parts of butadiene and 25 to 0 parts of styrene in the presence of metallic sodium catalyst. Polymerization is carried out in a reaction diluent at temperatures from about 25° C. to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers;

preferred diluents are aliphatic hydrocarbons such as solvent naphtha or straight-run mineral spirits such as Varsol. In order to obtain a water-white product, a codiluent, about 10 to 45 parts per 100 parts of monomers, may also be used, consisting of a $C_4$ to $C_8$ aliphatic ether or cyclic ethers and polyethers other than those having a –O–C–O– grouping; particularly useful ethers are dioxane-1,4 and diethyl ether. Finally, it is beneficial to use about 5 to 35 weight percent (based on sodium) of an alcohol such as methanol, isopropanol, or an amyl alcohol in order to overcome the initial induction period. The resulting product may vary in viscosity from 0.15 to 20 poises (measured at 50% NVM in Varsol), and may be altered as desired for use in the curable liquid mix. The preparation of this oil is described in U.S. Patent 2,762,851 which is incorporated herein by reference.

As previously stated, it is necessary for the success of this invention for these oils to be chemically modified with oxygen in the structure. One method for accomplishing this is to blow these oils with air or oxygen, preferably in the presence of a solvent, as aromatic solvents or solvent mixtures having a kauri-butanol value of at least 40. More paraffinic solvents as Varsol may also be used if a product containing less oxygen is desired. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octoates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 0.1 to 10%, preferably 0.2 to 5%, oxygen in the structure. Above 10% the viscosity of the solution is too high and difficulty occurs in stripping the solvent from the oxidized oil which is performed to prevent degradation of the adhesive therefrom. This oxidized oil can be included in the resinifiable polymer mix previously described.

It is also within the purview of this invention to incorporate oxygen in the structure of a polydiolefin oil by the addition of an anhydride of an unsaturated dicarboxylic acid, e.g., maleic anhydride, chloromaleic anhydride or citraconic anhydride. However, maleic anhydride is preferred. This modification can be accomplished by adding maleic anhydride to the reactants prior to or during the polymerization. However, the preferred method is to add maleic anhydride to the oil after polymerization and heat the mixture therefrom at a temperature of between 50° to 250° C., preferably 180° to 220° C. for about 15 minutes to 2 hours. In accordance with this invention, it is preferred for the polymeric oil to be modified with between 0.01 to 2.5%, preferably 0.05 to 0.5% of the unsaturated anhydride, e.g., maleic anhydride. This chemical modification of the curable drying oil, which can be also included in the polymer mix, is described in U.S. Patent 2,652,342 which is also incorporated herein by reference.

In accordance with this invention, the resinifiable polymeric mix, heretofore described, is applied to the surface of the metal and/or the polyolefin plastic. The items are thereby coated with a sufficient amount of the mix to completely wet all surfaces to be bonded. A small excess is preferable in many applications. Layers of the coated metal and plastic are formed and are subsequently cured to a unitary structure. Curing may be accomplished by any known method such as baking in a press mold, impinged flames, or electronic induction heating. An example of a suitable method is by baking in a press mold at a temperature range of 250° to 500° F. for between 1 minute and 2 hours under pressures from 0 to 1500 p.s.i.g., preferably between 5 to 700 p.s.i.g. It may also be advantageous to incorporate a postcure between 290° and 350° F. for 3 minutes to 24 hours.

Thus, the product, which results from this invention, is a unitary structure comprising a polyolefin plastic bonded to a metal with an adhesive therebetween which comprises a chemically modified polydiolefin. There is improved adhesion between the two materials and therefore, this invention overcomes a serious disadvantage which has been found in the past. It is now possible, to manufacture certain items, such as an undersea cable in which the adhesive strength between the metallic wire and plastic insulation is important. Other significant uses of this invention are the bonding of liners to tanks, the bonding of polyethylene coatings on plating racks, and applying a plastic coating to protect metals from corrosion.

The following examples are submitted to illustrate and not to limit this invention.

*Example I*

A butadiene-styrene oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: Benzene—100 K.B. value, n-heptane 25.4 K.B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poises at 50% NVM in Varsol solution and the nonvolatile portion thereof had an average molecular weight of about 8,000.

The polymeric oil was then mixed with 1% of maleic anhydride and heated to 450° F. for 160 minutes. A curable polymer mix was prepared by adding 20 parts of methyl styrene and 6 parts of dicumyl peroxide to 90 parts of the drying oil modified with maleic anhydride. A coating of the resinifiable mix was applied to the surface of a 0.012-inch tin plate-iron sheet, a ⅛-inch pad of polyethylene, and a 1/16-inch brass plate. The coated tin plate, polyethylene, and brass plate were placed in layers in that order in a press mold and cured by baking for 30 minutes at 255° F. and 700 p.s.ig. pressure. A subsequent postcure was employed in an oven for 30 minutes at 300° F. The unitary structure therefrom was firmly bonded together.

*Example II*

The polymeric oil of Example I was oxidized by air blowing in the presence of toluene as a solvent and 0.01% of manganese naphthenate as a catalyst to incorporate 1.3% of oxygen in the structure. A curable polymer mix was prepared by adding 20 parts of methyl styrene and 7 parts of dicumyl peroxide to 90 parts of oxidized drying oil which had been stripped of solvent. A thin coating of the resinifiable mix was applied to the surfaces of two clean ⅜-inch steel plates and a ⅛-inch pad of polyethylene. One of the coated steel plates, the coated polyethylene pad, and the other coated steel plate were placed in layers in that order in a press mold and cured by baking for 60 minutes at 270° F. and 10 p.s.i. pressure using a simple compression spring to apply pressure during cure. The unitary structure therefrom was cooled and subjected to a test, to determine the adhesive strength, in a procedure similar to ASTM D429. A pressure of 455 p.s.i. was required to break the adhesive bond. Examination of the freshly separated surfaces indicated that 60% adhesive-to-metal and 40% adhesive-to-polyethylene had occurred.

*Example III*

The polymeric resin mix of Example II comprising the oxidized polydiolefin was coated upon the surface of two ¹⁄₁₆-inch clean hardened brass plates and upon both surfaces of a 1½-inch polyethylene disc ⅛-inch thick. One of the coated brass plates, the coated polyethylene disc, and other other coated brass plate were placed in layers in that order in a press mold and cured by baking for 60 minutes at 270° F. and 50 p.s.i.g. pressure. A Teflon washer was used to prevent excessive extrusion of the polyethylene during cure. The unitary structure therefrom was cooled and subjected to a shear test by applying a load with a conventional tensile tester (Tinius-Olson) at the rate of 0.05 inch per minute to the projecting ends of the steel plates. This testing procedure is similar to ASTM 1002–53T. A shear load of 135 pounds was required to break the adhesive bond. No bond was obtained under the same conditions in the absence of a suitable adhesive.

*Example IV*

The polymeric oil of Example I was oxidized by air blowing to incorporate between 0.2 and 10% oxygen in its structure. A curable polymer mix was prepared by adding 20 to 50 parts of vinyl toluene and 0.2 to 10 parts of dicumyl peroxide and ditertiary butyl peroxide. A thin coating was applied to the surface of a brass plate and a polypropylene disc, each being between ¹⁄₁₀,₀₀₀ and ¼ inch in thickness. The coated items were placed in a press mold and cured by baking between 250° and 500° F. for 1 to 120 minutes. A unitary structure in accordance with this procedure would be provided with a strong bond between the metal plate and polypropylene disc.

In summary, the examples demonstrate that a polyolefin plastic, e.g., polyethylene and polypropylene, can be bonded to a metal if a chemically modified polydiolefin oil is incorporated as an adhesive therebetween. This polydiolefin oil can be modified by incorporating oxygen in the structure by air blowing or by adding an anhydride of an unsaturated dicarboxylic acid.

Having described the general nature and specific embodiments of the present invention, the true scope is now particularly pointed out in the appended claims.

What is claimed is:

1. A unitary structure comprising a metal layer and a polyolefin plastic layer selected from the group consisting of polyethylene and polypropylene, said layers having a cured adhesive film therebetween prepared from liquid polymers of conjugated diolefins selected from the group consisting of butadiene, isoprene, dimethyl butadiene, piperylene and methyl pentadiene, which polymers have been oxidized to an oxygen content of 0.1 to about 10% by air blowing with a gas selected from the group consisting of air and oxygen in the presence of an aromatic hydrocarbon solvent having a kauri-butanol value of at least 40, and subsequently cured in situ in the presence of a peroxide catalyst by subjecting the unitary structure to a temperature between 250–500° F.

2. A unitary structure comprising a metal layer and a polyolefin plastic layer selected from the group consisting of polyethylene and polypropylene, said layers having an adhesive film therebetween prepared from liquid polymers of conjugated diolefins selected from the group consisting of butadiene, isoprene, dimethyl butadiene, piperylene, and methyl pentadiene, which polymers have been reacted with 0.01 to 2.5 wt. percent of an unsaturated aliphatic dicarboxylic acid anhydride, selected from the group consisting of maleic anhydride, chloromaleic anhydride, and citraconic anhydride, and subsequently cured in situ in the presence of a peroxide catalyst by subjecting the unitary structure to a temperature between 250–500° F.

3. A unitary structure as in claim 1 wherein the liquid polymer is selected from the group consisting of polybutadiene and the copolymer of butadiene and styrene.

4. A unitary structure as in claim 2 wherein the liquid polymer is selected from the group consisting of polybutadiene and the copolymer of butadiene and styrene.

5. The unitary structure of claim 1 in which the air blown polymer is cured in the additional presence of up to 60% by weight of a crosslinking agent selected from the group consisting of vinyl toluene, diallyl phthalate, and styrene.

6. The unitary structure of claim 2 in which the anhydride modified polymer is cured in the additional presence of up to 60% by weight of a crosslinking agent selected from the group consisting of vinyl toluene, diallyl phthalate, and styrene.

7. A method of bonding a metal layer to a polyolefin plastic layer selected from the group consisting of polyethylene and polypropylene which comprises coating the surfaces of said metal and said plastic layer with an adhesive film of a liquid polymer of a conjugated diolefin selected from the group consisting of butadiene, isoprene, dimethyl butadiene, piperylene, and methyl pentadiene which polymer has been oxidized to an oxygen content of 0.1 to about 10% by air blowing with a gas selected from the group consisting of air and oxygen in the presence of an aromatic hydrocarbon solvent having a kauri-butanol value of at least 40, in admixture with a peroxide catalyst, forming the metal layer and the polyolefin plastic layer into a unitary structure with the adhesive film therebetween and subjecting the unitary structure to a temperature of between about 250 and about 500° F. to cure the adhesive film.

8. A method of bonding a metal layer to a polyolefin plastic layer selected from the group consisting of polyethylene and polypropylene which comprises coating the surfaces of said metal and said plastic layer with an adhesive film of a liquid polymer of a conjugated diolefin selected from the group consisting of butadiene, isoprene, dimethyl butadiene, piperylene and methyl pentadiene which polymer has been reacted with 0.01 to 2.5 wt. percent of an unsaturated aliphatic dicarboxylic acid anhydride selected from the group consisting of maleic anhydride, chloromaleic anhydride, and citraconic anhydride, in admixture with a peroxide catalyst, forming the metal layer and polyolefin plastic layer into a unitary structure with the adhesive film therebetween and subjecting the unitary structure to a temperature of between about 250 and about 500° F. to cure the adhesive film.

9. A method of bonding as in claim 7 wherein the liquid polymer is selected from the group consisting of polybutadiene and copolymer of butadiene and styrene.

10. A method of bonding as in claim 8 wherein the liquid polymer is selected from the group consisting of polybutadiene and copolymer of butadiene and styrene.

11. A method of bonding as in claim 7 wherein the adhesive film is additionally mixed with a crosslinking agent selected from the group consisting of vinyl toluene, diallyl phthalate, and styrene.

12. A method of bonding as in claim 8 wherein the adhesive film is additionally mixed with a crosslinking agent selected from the group consisting of vinyl toluene, diallyl phthalate, and styrene.

References Cited in the file of this patent

UNITED STATES PATENTS

| | | |
|---|---|---|
| 2,275,951 | Farmer | Mar. 10, 1942 |
| 2,622,056 | De Coudres et al. | Dec. 16, 1952 |
| 2,634,256 | Sparks et al. | Apr. 7, 1953 |
| 2,635,975 | Peters | Apr. 21, 1953 |
| 2,652,342 | Gleason | Sept. 15, 1953 |
| 2,819,302 | Koenecke | Jan. 7, 1958 |
| 2,843,561 | Ingley et al. | July 15, 1958 |
| 2,844,502 | Paxton | July 22, 1958 |
| 2,908,585 | Koenecke | Oct. 13, 1959 |

FOREIGN PATENTS

| | | |
|---|---|---|
| 885,886 | France | Sept. 28, 1943 |
| 739,634 | Great Britain | Nov. 2, 1955 |